United States Patent [19]
Tokuda

[11] Patent Number: 5,889,581
[45] Date of Patent: Mar. 30, 1999

[54] ILLUMINATING LIGHT SOURCE APPARATUS FOR PHOTOGRAPHIC PRINTER

[75] Inventor: Kanji Tokuda, Kaisei-machi, Japan

[73] Assignee: Fuji Photo Film Co., Ltd., Kanagawa, Japan

[21] Appl. No.: 923,272

[22] Filed: Sep. 4, 1997

Related U.S. Application Data

[63] Continuation of Ser. No. 507,834, Jul. 27, 1995.

[30] Foreign Application Priority Data

Jul. 29, 1994 [JP] Japan ................................. 6-178432

[51] Int. Cl.⁶ .......................... G03B 27/54; G03B 27/72
[52] U.S. Cl. ............................................. 355/71; 355/67
[58] Field of Search ............................ 362/200, 296, 362/297, 298, 257, 293; 355/71, 67

[56] References Cited

U.S. PATENT DOCUMENTS 4,095,881  6/1978  Maddox ................ 355/30 O

*Primary Examiner*—Richard Moses
*Assistant Examiner*—Shival Virmani
*Attorney, Agent, or Firm*—Sughrue, Mion, Zinn, Macpeak & Seas, PLLC

[57] ABSTRACT

A compact and inexpensive illuminating light source apparatus for a photographic printer, which is designed so that infrared rays emitted from a lamp are reused without dissipating as heat, thereby considerably improving the light source efficiency, and that color and other characteristics are not affected by replacement of the lamp, and further that the apparatus is easy to produce and simple in arrangement. All the components of light that is emitted from a filament (FM) of a lamp (S) are reflected by a total internal reflection reflector (R1) having a paraboloid of revolution, and the resulting parallel beam of light is perpendicularly incident on an infrared reflecting plate (RP). The visible light component in the incident light passes through the infrared reflecting plate (RP) and is used to print a film. The infrared component is reflected by the infrared reflecting plate (RP) so as to return to the filament (FM) of the lamp (S), traveling backwards along the optical path. Accordingly, the heating efficiency of the lamp (S) improves to such an extent that the greater part of the electric energy can be appropriated for visible light, which is useful for printing. Thus, it becomes possible to realize a high-intensity visible light emitting light source even with a lamp of relatively low electric power consumption.

10 Claims, 5 Drawing Sheets

ILLUMINATING LIGHT SOURCE APPARATUS FOR PHOTOGRAPHIC PRINTER

This is a Continuation of application Ser. No. 08/507,834 filed Jul. 27, 1995.

BACKGROUND OF THE INVENTION

The present invention relates to an illuminating light source apparatus for a photographic printer. More particularly, the present invention relates to an illuminating light source apparatus which enables an improvement in the light source efficiency of a photographic printer, and consequently allows an increase in the quantity of light usable for the printing process.

In a photographic printer (hereinafter referred to as simply "printer"), as shown in FIG. 4, light that is emitted from a lamp S is converted into a parallel or convergent beam of light by a reflector R and the light is then diffused through a first diffuser D1, a mirror box M, and a second diffuser D2, thereby producing diffused light that is required as a printer light source. Then, the diffused light is applied to a film F to print an enlarged image of the film F on photographic paper P through a lens L, whereby blemish or dust on the image recorded on the film F is made inconspicuous.

A conventional light source for a printer has a structure such as that shown, for example, in the sectional view of FIG. 5. The reflector R has a reflecting multilayer film ML deposited on the inner surface of a glass substrate G. The reflecting multilayer film ML has such spectral transmittance characteristics that, among light that is emitted from the lamp S, only a light component in and near the visible region, which is useful for printing, is reflected, as shown by the solid lines in the figure, whereas infrared radiation, which makes up most of the light emitted from the lamp S, is transmitted and thus removed. FIG. 6 shows an example of such spectral transmittance characteristics of the reflecting multilayer film ML.

A reflecting mirror that separates and removes the infrared component from light emitted from a light source lamp as described above is called "cold mirror". Arrangements in which such a cold mirror is disposed behind or in front of a light source lamp have been proposed in Japanese Utility Model Application Post-Examination Publication Nos. 49-26665 and 50-2016, and Japanese Patent Application Unexamined Publication (KOKAI) No. 59-79236.

The reason why infrared rays among light rays emitted from the lamp S are not used for photographic printing is that, if infrared rays are absorbed by the film F and consequently the temperature of the film F rises, the density of dyestuffs constituting the image of the film F undesirably reduces. This phenomenon is sometimes called "thermotropy". Owing to the phenomenon, when a multiplicity of prints are produced from the same film image, the hue of the finished prints gradually changes. This is unfavorable for color prints, in which importance is attached to the stability of color tone. It is necessary in order to suppress such phenomenon to cut off infrared rays so that no heat will be generated from illuminating light that is applied to the film F. With regard to the spectral sensitivities for three colors of color photographic paper P, the spectral sensitivity for red covers a considerable part of the infrared region. On the other hand, the spectral sensitivity of a photodetector for measuring light passing through the film F, which is used for exposure control, does not cover the infrared region. Accordingly, if exposure control is effected with the spectral sensitivity difference between them left as it is, it is impossible to detect that the color photographic paper P is being exposed to infrared rays which cannot be detected with the photodetector. Therefore, exposure control cannot accurately be effected. In order to allow the spectral characteristics of the color photographic paper P and the photodetector to match each other, it is necessary to exclude infrared rays from the illuminating light source. For the above-described reasons, the infrared component is separated and removed by the cold mirror ML, etc.

In the conventional printer light source in which the infrared component is separated and removed from light emitted from the lamp S by using the cold mirror ML, as described above, the infrared radiation, which accounts for 80% or more of the energy emitted from the lamp S, is all dissipated as thermal energy. With regard to the remaining visible light also, only a part of it is used for printing. The transmitted infrared rays are absorbed by an infrared absorbing object (not shown) which is present around the reflector R, and thus escape in the form of heat. Accordingly, a fan for cooling the object around the reflector R is also required. For this reason, the conventional printer light source has been unavoidably large in size and costly.

The present applicant has proposed some techniques concerning diffusers in order to improve the light source efficiency, which has heretofore been inferior as described above, in Japanese Patent Application Unexamined Publication (KOKAI) Nos. 1-298337 and 2-278243, and Japanese Patent Application No. 6-66049.

Incidentally, there has been proposed a halogen lamp with an infrared reflecting film, in which, as shown in the sectional view of FIG. 7, infrared rays emitted from a filament FM of a lamp S are reflected back to the filament FM by an infrared ray reflecting film RL provided on the inner surface of a glass tube which constitutes the lamp S, thereby utilizing the reflected infrared rays for heating the filament FM (see "Nikkei Electronics", Jun. 24, 1991, P.145). The proposed arrangement enables infrared rays emitted from the lamp to be reduced by about 40%, and also makes it possible to reduce the consumed electric power by about 15%.

However, if a light source that employs such a halogen lamp with an infrared reflecting film is applied to a photographic printer, the following problems arise:

(1) The infrared reflecting film must be deposited on the inner surface of the tube of the lamp, and it is extremely difficult to produce a reflecting film having precise spectral characteristics on such a curved surface by vapor deposition, and it is also difficult to obtain the required spectral characteristics with satisfactory accuracy.

(2) Since the infrared reflecting film is formed on the inner surface of the tube of the lamp, it is an integral part of the lamp itself. Consequently, when the lamp is to be replaced with a new one because its lifetime has expired, the infrared reflecting film must also be replaced together with the lamp. Thus, since the lamp which is to be replaced is per se costly, the lamp and the infrared reflecting film constitute in combination an expensive expendable article. Strictly speaking, the spectral characteristics of the reflecting film of the lamp replacing the old one are different from those of the former reflecting film. Therefore, the color components of light rays emitted from the old and new lamps are also different from each other.

Particularly, the problem (2) is fatal to a printer light source which needs to replace the lamp frequently.

SUMMARY OF THE INVENTION

In view of the above-described problems of the conventional technique, an object of the present invention is to provide a compact and inexpensive illuminating light source apparatus for a photographic printer, which is designed so that infrared rays emitted from a lamp are reused without dissipating as heat, thereby considerably improving the light source efficiency, and that color and other characteristics are not affected by replacement of the lamp, and further that the apparatus is easy to produce and simple in arrangement.

To attain the above-described object, the present invention provides an illuminating light source apparatus for a photographic printer, which includes a lamp that emits light on heating, and a condenser that condenses light emitted from the lamp to illuminate a film which is to be subjected to photographic printing. An infrared reflecting device which selectively reflects only infrared rays toward the lamp is provided in an optical path which extends from the condenser to the film.

In this case, the infrared reflecting device may be an infrared reflecting plate which is disposed at right angles to the optical axis of the condenser, and which reflects infrared rays but transmits visible rays. Alternatively, the infrared reflecting device may be a combination of an infrared reflecting plate which is disposed at an angle to the optical axis of the condenser, and which reflects visible rays but transmits infrared rays, and a total reflection mirror which is disposed at a side of the infrared reflecting plate where the transmitted infrared rays emerge, at right angles to the optical axis of the condenser.

The condenser may be a reflector having a paraboloid of revolution, a reflector having an ellipsoid of revolution, etc.

In the present invention, an infrared reflecting device which selectively reflects only infrared rays toward the lamp is provided in an optical path which extends from the condenser to the film. Therefore, the filament, which is heated to emit light, is further heated by the reflected infrared rays. Accordingly, the thermal efficiency improves, and it is possible to obtain a light source which provides a high illuminance at relatively low electric power consumption. Further, since replacement of the lamp causes no change in the color of light used for printing, it is unnecessary to readjust printing conditions. In addition, since heat dispersion is minimal, a small-sized fan suffices for cooling the light source.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the illuminating light source apparatus for a photographic printer according to the present invention will be described below with reference to the accompanying drawings.

Figure 1:
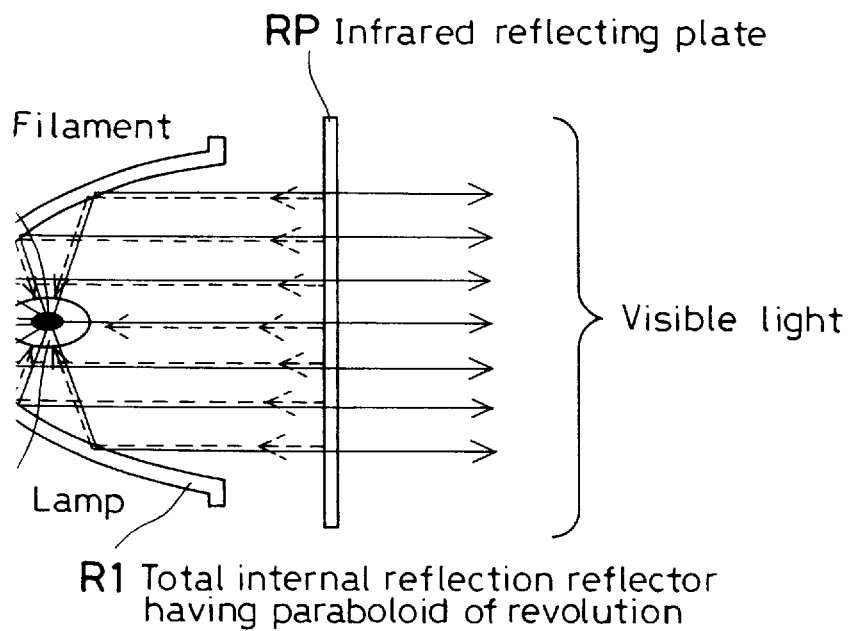
FIG. 1 is a sectional view of an illuminating light source apparatus for a photographic printer according to a first embodiment of the present invention, taken along an optical axis of the apparatus.

FIG. 1 is a sectional view of a first embodiment of the illuminating light source apparatus for a photographic printer according to the present invention, taken along an optical axis of the apparatus. In the figure, reference symbol S denotes a lamp having a filament FM in a tube. A total internal reflection reflector R1 has a paraboloid of revolution. An infrared reflecting plate RP reflects infrared rays but transmits visible rays. The lamp S is disposed so that the filament FM lies at the focal point of the reflector R1. The infrared reflecting plate RP is disposed in the optical path so as to lie perpendicular to the optical axis of the reflector R1. The reflector R1 may be formed by depositing a metallic reflecting film or the like on a glass substrate whose inner surface is a paraboloid of revolution. Alternatively, the reflector R1 may be a metallic member whose inner surface is a total reflection mirror surface. The infrared reflecting plate RP may be formed, for example, by depositing on a glass substrate a multilayer film that selectively reflects only infrared rays. It should be noted that the term "total reflection" as used in this specification means that the reflecting device concerned reflects almost all light not only in the visible region but also in the infrared region.

Figure 4:
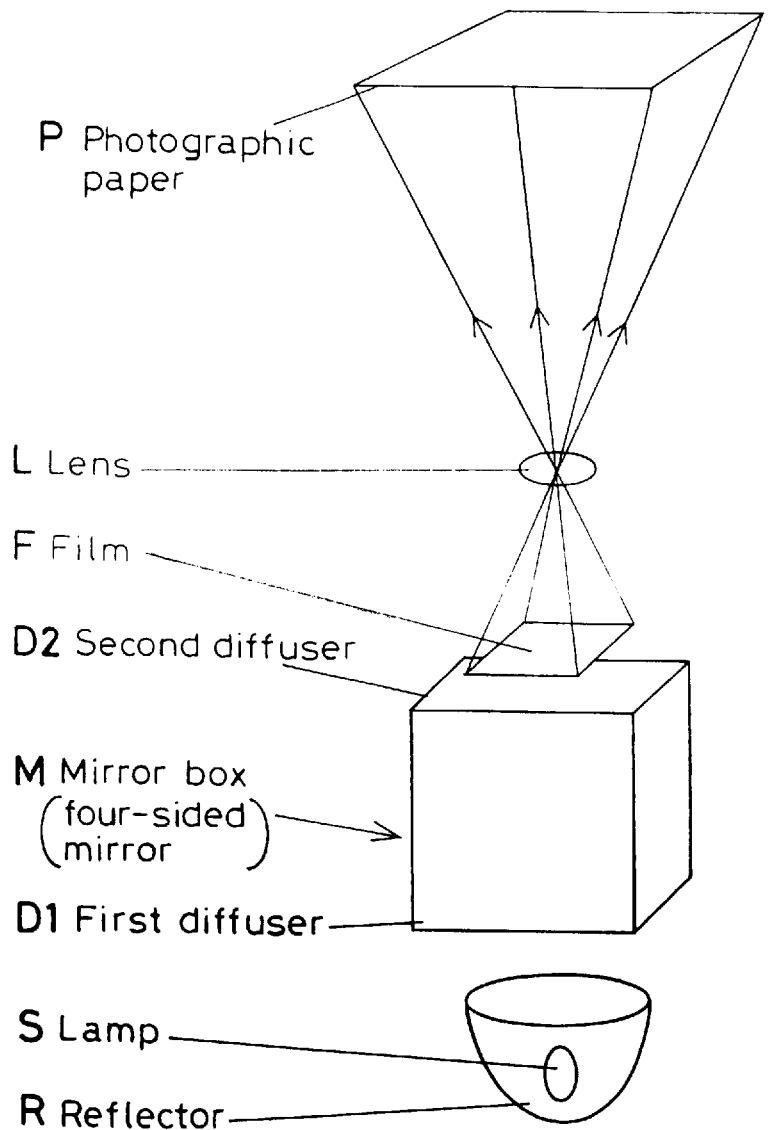
FIG. 4. is a perspective view schematically showing the whole arrangement of a photographic printer.
Figure 5:
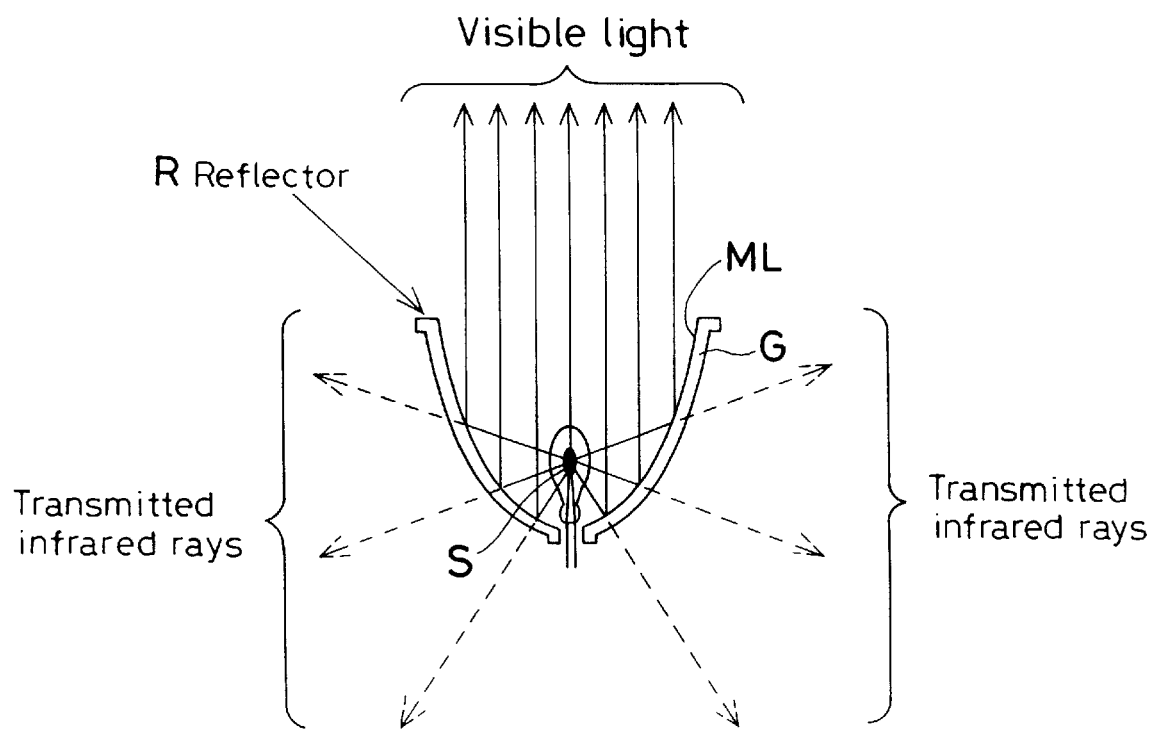
FIG. 5 is a sectional view of a conventional light source for a photographic printer, taken along an optical axis of the apparatus.
Figure 6:
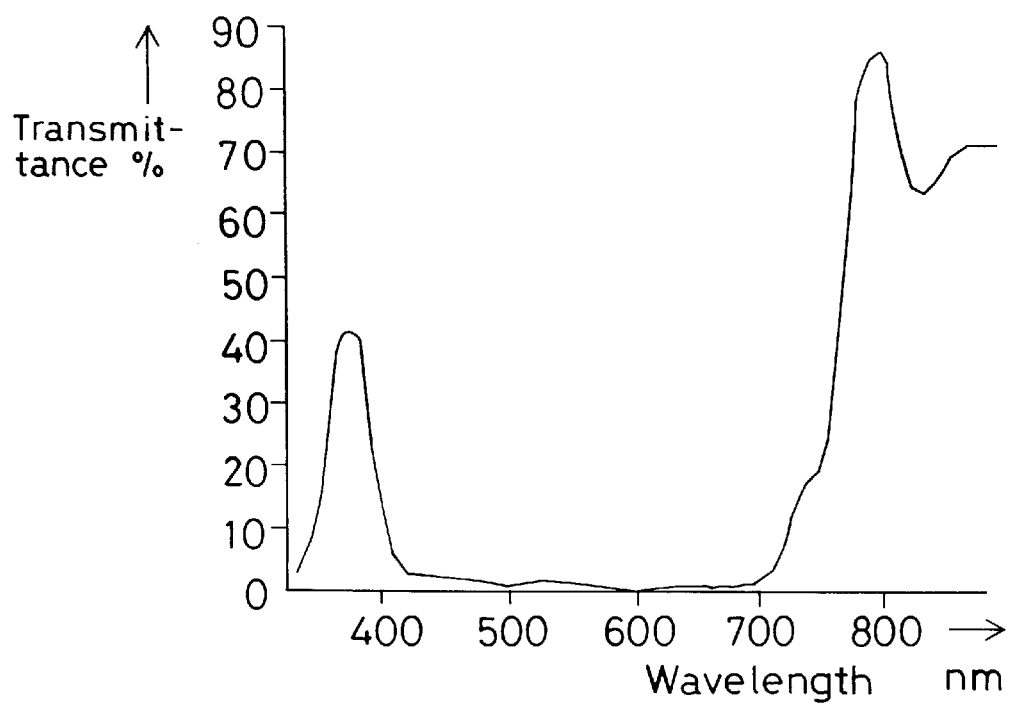
FIG. 6 is a graph showing an example of spectral transmittance characteristics of a reflecting multilayer film provided on a reflector in the arrangement shown in FIG. 5.
Figure 7:
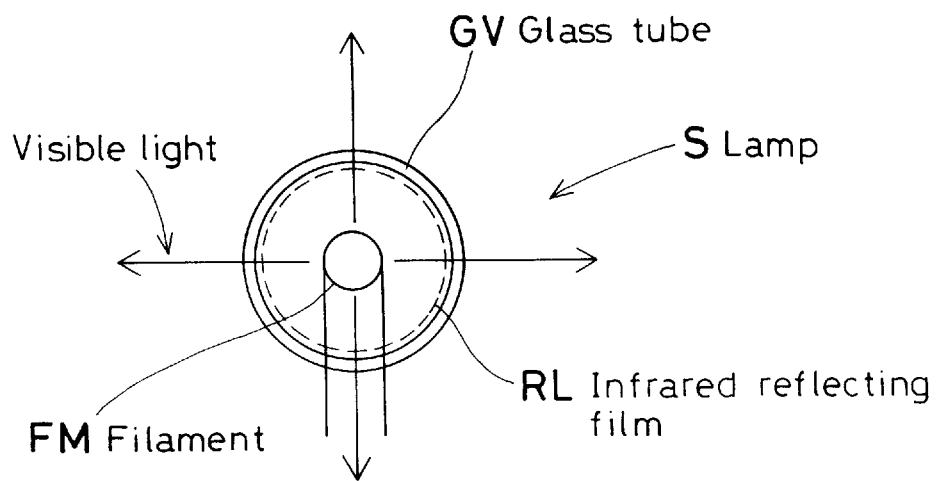
FIG. 7 shows a sectional structure of a conventional halogen lamp with an infrared reflecting film.

By virtue of the above-described arrangement, visible and infrared rays in light that is emitted from the filament FM of the lamp S are reflected by the total internal reflection reflector R1 having a paraboloid of revolution, and the resulting parallel beam of light is perpendicularly incident on the infrared reflecting plate RP. The visible light component in the incident light passes through the infrared reflecting plate RP, and enters a mirror box (not shown; see FIG. 4), thereby being used to print a film. Meanwhile, the infrared component, which is shown by the broken lines in FIG. 1, is reflected by the infrared reflecting plate RP so as to return to the filament FM of the lamp S, traveling backwards along the optical path. Accordingly, the heating efficiency of the lamp S improves to such an extent that the greater part of the electric energy can be appropriated for visible light, which is useful for printing. Thus, it becomes possible to realize a high-intensity visible light emitting light source even with a lamp of relatively low electric power consumption.

Figure 2:
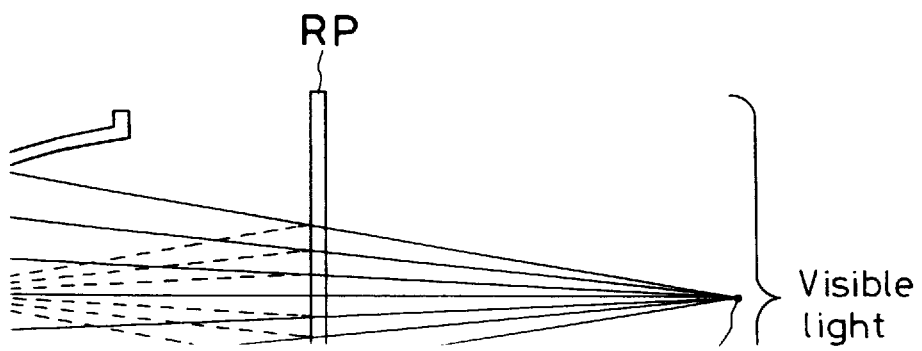
FIG. 2 is a sectional view of an illuminating light source apparatus for a photographic printer according to a second embodiment of the present invention, taken along an optical axis of the apparatus.

FIG. 2 is a sectional view of a second embodiment of the illuminating light source apparatus for a photographic printer according to the present invention, taken along an optical axis of the apparatus. This embodiment is a modification of the first embodiment, in which a total internal reflection reflector R2 having an ellipsoid of revolution is used as a reflector. The lamp S is disposed so that the filament FM lies at one focal point F1 of the reflector R2, and the infrared reflecting plate RP is disposed at the middle point between the two focal points F1 and F2 of the reflector R2 so as to lie perpendicular to the optical axis of the reflector R2. In this case, visible and infrared rays in light that is emitted from the filament FM of the lamp S are reflected by the total internal reflection reflector R2 having an ellipsoid of revolution, and are incident on the infrared reflecting plate RP as light that converges on the second focal point F2. The visible light component in the incident light passes through the infrared reflecting plate RP, and converges on the second focal point F2. Meanwhile, the infrared component, which is shown by the broken lines in the figure, is reflected by the infrared reflecting plate RP so as to return to the filament FM of the lamp S, traveling toward the first focal point F1. Accordingly, the heating efficiency of the lamp S improves to such an extent that the greater part of the electric energy can be appropriated for visible light, which is useful for printing, and it becomes possible to realize a high-intensity visible light emitting light source even with a lamp of relatively low electric power consumption, in the same way as in the first embodiment.

In this embodiment, visible light passing through the infrared reflecting plate RP converges on the focal point F2. Therefore, the entrance of the mirror box can be made small in size (see FIG. 3). Consequently, once a light beam enters the mirror box, it cannot return. Accordingly, the light utilization efficiency can be further improved.

Figure 3:
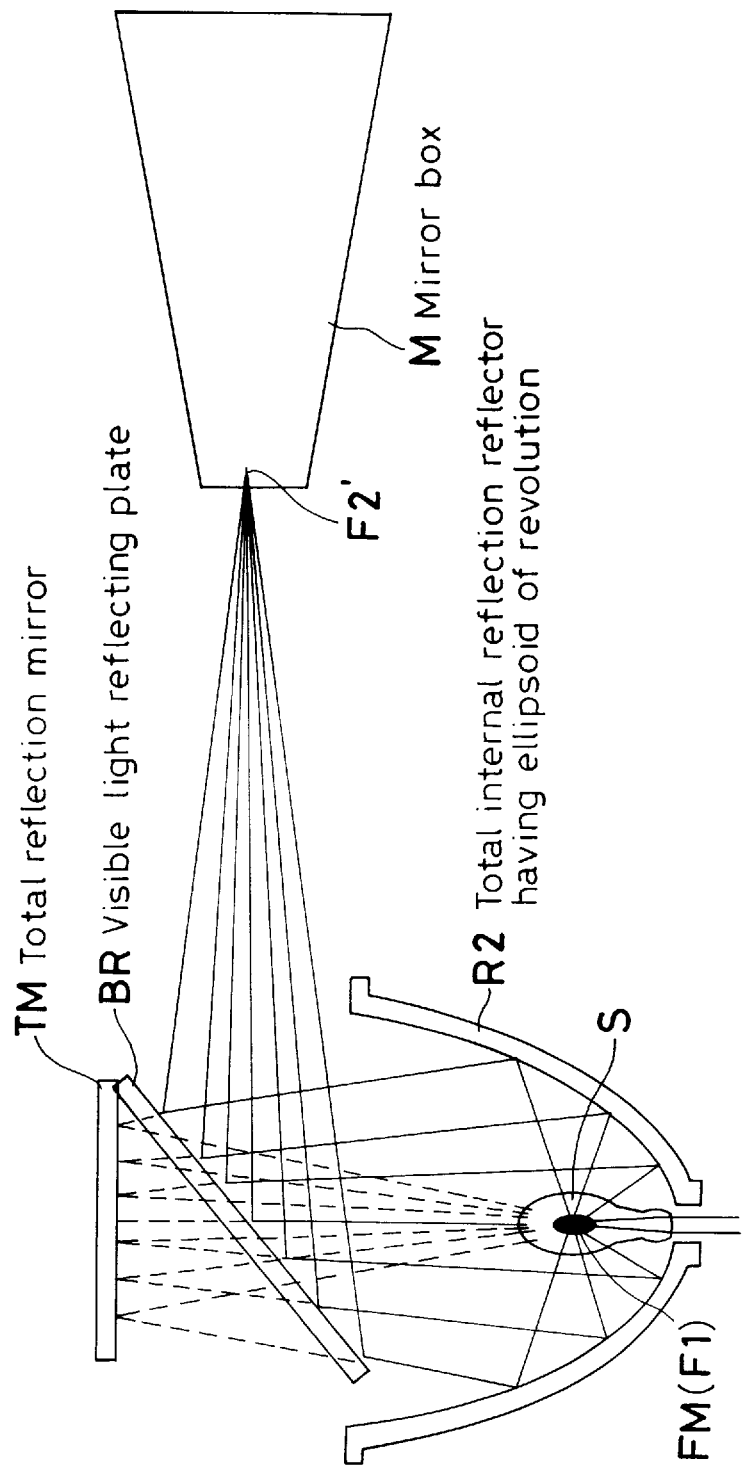
FIG. 3 is a sectional view of an illuminating light source apparatus for a photographic printer according to a third embodiment of the present invention, taken along an optical axis of the apparatus.

FIG. 3 shows a third embodiment of the present invention, which is a modification of the second embodiment, which is shown in FIG. 2. In the third embodiment, the infrared reflecting plate RP is replaced by a combination of a visible light reflecting plate BR which transmits infrared rays but reflects visible rays, and a total reflection mirror TM. The visible light reflecting plate BR may be formed, for example, by depositing on a glass substrate a multilayer film which selectively reflects only visible light. The total reflection mirror TM is a plane mirror which is similar in structure to the reflectors R1 and R2. The visible light reflecting plate BR is disposed not at right angles but at an angle of 45°, for example, to the optical axis (i.e., the axis passing through the focal points F1 and F2) of the total internal reflection reflector R2. Accordingly, the reflected visible light, which is shown by the solid lines in the figure, enters the mirror box M while being converged on a point F2' of mirror symmetry with respect to the focal point F2 of the reflector R2 at an angle of 90°, for example, to the optical axis of the reflector R2. The visible light is then used to print a film in the form of diffused light. Meanwhile, the infrared light, shown by the broken lines in the figure, which has passed through the visible light reflecting plate BR is reflected by the total reflection mirror TM so as to return toward the lamp S, repassing through the visible light reflecting plate BR from the rear. If the total reflection mirror TM is disposed at the middle point between the two focal points F1 and F2 of the reflector R2 so as to lie perpendicular to the optical axis of the reflector R2 in the same way as in the case of the infrared reflecting plate RP shown in FIG. 2, the infrared rays reflected by the total reflection mirror TM return to the filament FM of the lamp S. In this embodiment, since the optical path is bent by using the visible light reflecting plate BR, the overall size of the apparatus can be minimized. It should be noted that the total internal reflection reflector R2 having an ellipsoid of revolution in the third embodiment may be replaced by the total internal reflection reflector R1 having a paraboloid of revolution, which is shown in FIG. 1.

Although the illuminating light source apparatus for a photographic printer according to the present invention has been described above by way of some embodiments, it should be noted that the present invention is not necessarily limited to the described embodiments, and that various changes and modifications may be imparted thereto. For example, the infrared reflecting plate RP in FIG. 2 and the total reflection mirror TM in FIG. 3 may be formed by using a curved plate having a curved surface, exclusive of a plane surface, thereby ensuring freedom for layout of these members.

As will be clear from the foregoing description, the illuminating light source apparatus for a photographic printer according to the present invention provides the following advantageous effects:

(1) Since infrared rays emitted from the filament of the lamp are returned to use them for heating the filament, the thermal efficiency is improved, and it is possible to obtain a light source which provides a high illuminance at relatively low electric power consumption.

(2) In comparison to the conventional light source lamp which has an infrared reflecting film deposited on the curved inner surface of a glass tube, the illuminating light source apparatus of the present invention has an infrared reflecting film which is deposited on a flat plate. Accordingly, the illuminating light source apparatus is easy to produce, and the required spectral characteristics can be obtained with high accuracy.

(3) Because of the low electric power consumption, deterioration of the lamp is minimized. Therefore, the lifetime of the lamp can be increased.

(4) In the conventional light source lamp, the infrared reflecting film is provided as an integral part of the lamp. Therefore, when the lamp is to be replaced with a new one, the infrared reflecting film must also be replaced together with the lamp. Thus, since the lamp which is to be replaced is per se costly, the lamp and the infrared reflecting film constitute in combination an expensive expendable article. In addition, since replacement of the lamp with a new one causes a change in color, it has heretofore been necessary to readjust printing conditions. In the light source apparatus of the present invention, however, not only the lamp to be replaced is inexpensive, but also replacement of the lamp causes no change in color. Accordingly, it is unnecessary to readjust printing conditions.

(5) When the infrared reflecting film is to be replaced with a new one because it has been deteriorated, the lamp need not be replaced together with the infrared reflecting film.

(6) Since thermal dispersion is minimal, a fan which has heretofore been used to cool the light source may be replaced by a smaller-sized fan. Further, it is possible to suppress deterioration of the printed image quality, reduction of the lamp lifetime, generation of noise, etc., which have heretofore been caused by the vibration of the fan conventionally employed.

What we claim is:

1. An illuminating light source apparatus for a photographic printer, comprising:

a lamp that emits light on heating;

a reflector having a paraboloid of revolution for condensing light emitted from the lamp to illuminate a film which is to be subjected to photographic printing; and means for selectively reflecting only infrared rays toward said lamp, said infrared reflecting means being provided in an optical path which extends from said reflector to the film.

2. An illuminating light source apparatus for a photographic printer according to claim 1, wherein said infrared reflecting means is an infrared reflecting plate which is disposed at right angles to an optical axis of said reflector, and which reflects infrared rays but transmits visible rays.

3. An illuminating light source apparatus for a photographic printer according to claim 1, wherein said infrared reflecting means comprises an infrared reflecting plate which is disposed at an angle to an optical axis of said reflector, and which reflects visible rays but transmits infrared rays, and a total reflection mirror which is disposed at a side of said infrared reflecting plate where transmitted infrared rays emerge, at right angles to the optical axis of said reflector.

4. An illuminating light source apparatus for a photographic printer, comprising:

a lamp that emits light on heating;

a reflector having an ellipsoid of revolution for condensing light emitted from the lamp to illuminate a film which is to be subjected to photographic printing; and means for selectively reflecting only infrared rays toward said lamp, said infrared reflecting means being provided in an optical path which extends from said reflector to the film.

5. An illuminating light Source apparatus for a photographic printer according to claim 4, wherein said infrared reflecting means is an infrared reflecting plate which is disposed at right angles to an optical axis of said reflector, and which reflects infrared rays but transmits visible rays.

6. An illuminating light source apparatus for a photographic printer according to claim 4, wherein said infrared reflecting means comprises an infrared reflecting plate which is disposed at an angle to an optical axis of said reflector, and which reflects visible rays but transmits infrared rays, and a total reflection mirror which is disposed at a side of said infrared reflecting plate where transmitted infrared rays emerge, at right angles to the optical axis of said reflector.

7. The illuminating light source apparatus for a photographic printer according to claim 1, wherein said lamp is disposed at a focal point of said reflector.

8. The illuminating light source apparatus for a photographic printer according to claim 4, wherein said lamp is disposed at a focal point of said reflector.

9. An illuminating light source apparatus for a photographic printer according to claim 7, wherein substantially all the rays emitted from said lamp which are reflected by the paraboloid in a substantially parallel path are first incident upon the reflected surface of the paraboloid.

10. An illuminating light source apparatus for a photographic printer according to claim 8, wherein said lamp is a point light source.

* * * * *